July 18, 1950     M. NORTON     2,515,662
LAWN MOWER
Filed April 9, 1948
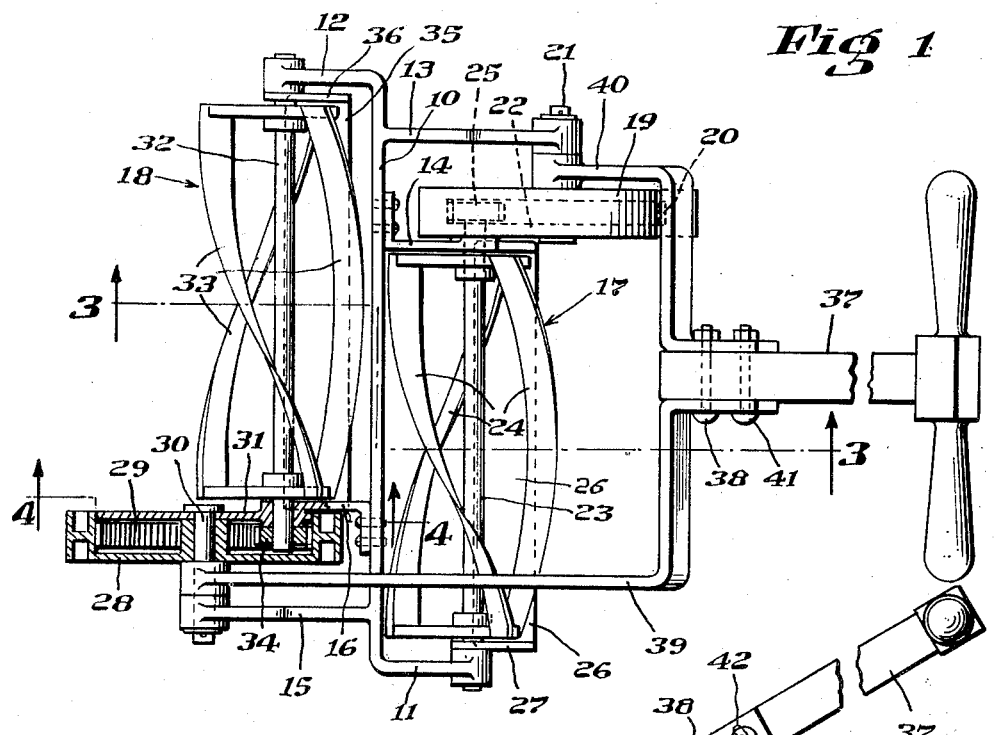
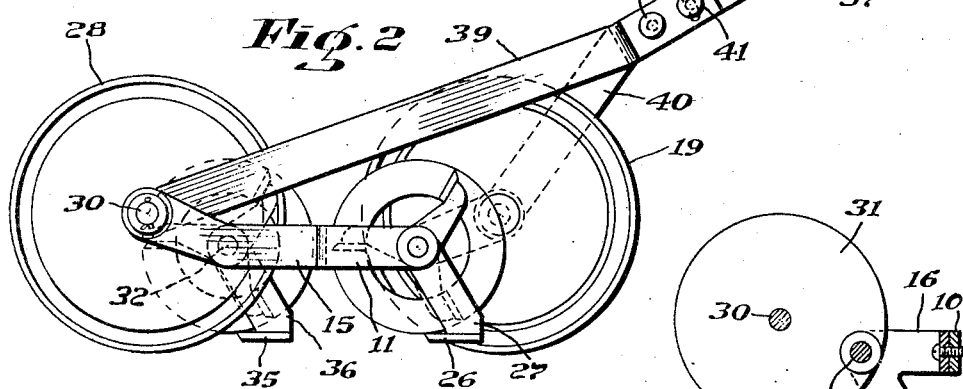
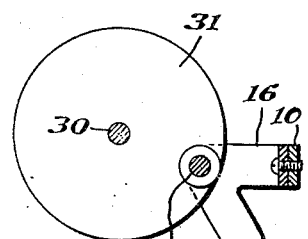
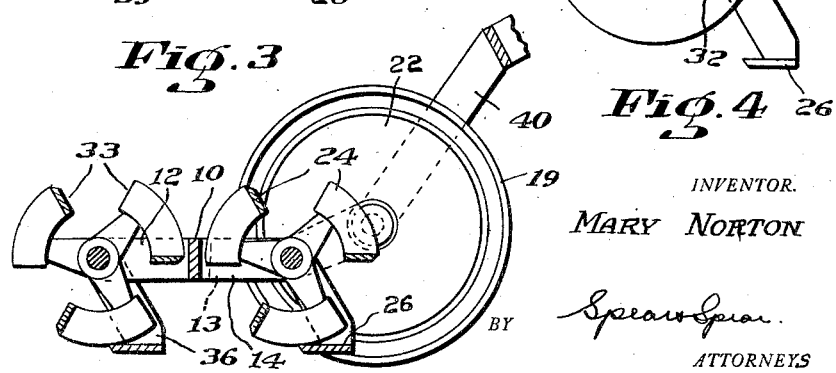
INVENTOR.
MARY NORTON
BY *Spear & Spear*
ATTORNEYS Patented July 18, 1950

2,515,662

UNITED STATES PATENT OFFICE 2,515,662

LAWN MOWER

Mary Norton, Portland, Maine

Application April 9, 1948, Serial No. 20,049

6 Claims. (Cl. 56—234)

My present invention relates to lawn mowers and particularly to a lawn mower adapted for general use as well as for such purposes as the trimming of the edges of lawns adjacent walks and gardens.

The conventional lawn mower is efficient and reliable but has the limitation that its cutting means are located between a pair of supporting wheels. As a consequence, not only is some of the grass to be cut lodged by one of those wheels, but also the wheels prevent that type of lawn mower from being used in edge trimming.

The result has been that many mowers have been proposed for use as edge trimmers to eliminate the necessity of employing hand operated clippers. While some of these have been accepted, such acceptance has been limited because of the expense entailed for extra equipment that cannot be used for purposes other than those for which such equipment was designed.

In accordance with my invention, I provide a frame having oppositely disposed ends adjacent each of which, but spaced inwardly thereof and extending oppositely thereto, are supports. Each of the supports defines with the opposite frame end a mount for a cutting unit. The cutting units are preferably substantially identical and each has a single wheel with the wheel of each unit being disposed adjacent the supports of the mount for that unit. Each cutting unit is disposed so that its cutting path and the path of its wheel is overlapped by the cutting path of the other unit.

In the accompanying drawings, I have shown an illustrative embodiment of my invention from which these and other of its novel features and advantages will be readily apparent.

In the drawings:

Fig. 1 is a plan view of a lawn mower in accordance with my invention.

Fig. 2 is a side view thereof, and

Figs. 3 and 4 are sections along the lines 3—3 and 4—4 respectively of Fig. 1.

At 10, I have indicated a frame member having oppositely disposed ends 11 and 12. Adjacent the frame end 12 but spaced inwardly thereof and disposed in the opposite direction are a pair of supports 13 and 14 and adjacent the frame end 11 but spaced inwardly thereof and disposed in a direction opposite thereto are a pair of like supports 15 and 16.

Each pair of supports defines with the opposite frame end a mount for a cutting unit. I have indicated generally the cutting units at 17 and 18. While these may be of other types and may be power driven, I have shown them as substantially identical except that they are driven from opposite ends.

The cutting unit 17 has a single wheel 19 provided with an internally toothed rim gear 20 and supported by a spindle 21 journalled in the support 13 and the end or cover plate 22 secured to the support 14 and constituting a part thereof. A rotor 23 carries a set of helically disposed blades 24 and has one extremity journalled in the frame end 11 and its other extremity extending through the end plate 22 and provided with a pinion gear 25 meshing with the rim gear 20. At 26, I have shown a cutter bar secured at one end to the frame end 11 by an arm 27 and at its other end to the support 14.

The cutting unit 18 has a similar wheel 28 which has an internally toothed rim gear 29 and is supported by a spindle 30 journalled in the support 15 and the end or cover plate 31 which is a part of the support 16. The rotor 32 of the unit 18 is provided with a set of helically disposed blades 33 and one of its extremities is supported in the frame end 12 and the other extremity extends through the end plate 31 and has a pinion 34 which meshes with the rim gear 29. The cutter bar 35 of the gear unit is supported at one end by an arm 36 secured to the frame end 12 and at its other end to the support 16.

I have not shown the means for adjusting the cutter bars 26 and 35 as such are conventional and unnecessary to an understanding of my invention. I have also omitted rollers as these are conventional and may be connected, if desired, to the supporting structure for the cutter bars.

At 37 I have indicated a handle pivotally connected as at 38 to the upper ends of the arms 39 and 40 and having a pin 41 extending through arcuate, transversely alined slots 42 in said upper arm ends which are concentric with the pivot 38. At their lower ends, the arms 39 and 40 are preferably connected to the frame as to the spindles 30 and 21 respectively so that pressure exerted by the operator will be applied in the zone of the wheels 19 and 28.

In accordance with my invention, the rotors are disposed relative to each other so that the path of the set of blades of one cutting unit and the path of its wheel is overlapped by the path of the set of blades of the other cutting member. Each cutting unit, therefore, cuts laterally of the path of the wheel of the other unit so that a lawn mower in accordance with my invention is equally adapted to general usage as well as edge trimming.

What I therefore claim and desire to secure by Letters Patent is:

1. A lawn mower comprising a transverse member having oppositely disposed ends, supporting means adjacent each of said ends, each of said means including first and second supports, both of which are disposed in a direction opposite to that of the end to which they are adjacent, a wheel rotatably mounted between each of said supports, and a unit supported by each of said second supports and the opposite end of said member, each of said units comprising a rotor, a set of helically disposed blades on said rotor, a gear connection between said rotor and the adjacent wheel, and a cutter bar disposed in operative relation to said blades, each of said supporting means being spaced inwardly from the adjacent end of said member so that the path of each set of blades overlaps that of the other unit and its driving wheel.

2. A lawn mower comprising a transverse member having oppositely disposed ends, supporting means adjacent each of said ends but spaced a substantial distance inwardly thereof, a pair of cutting units including a wheel, each of said units being supported by one end of said frame and the supporting means adjacent the other end thereof with the wheel of said units being disposed adjacent opposite ends of said member with the path of each wheel being overlapped by the path of the other cutting unit.

3. A lawn mower comprising a transverse member having oppositely disposed ends, supporting means adjacent each of said ends but spaced a substantial distance inwardly thereof, a pair of wheel driven cutting units, each of said units being supported by one end of said frame and the supporting means adjacent the other end thereof with the wheels of said units being disposed adjacent opposite ends of said member with the path of each wheel being overlapped by the path of the other cutting unit, and handle means connected to said frame.

4. The mower of claim 3 in which the handle means includes a pair of arms each of which is connected to the frame adjacent each of the wheels.

5. A lawn mower comprising a transverse member having oppositely disposed ends, supporting means adjacent each of said ends but spaced a substantial distance inwardly thereof, each of said means including first and second supports both of which are disposed in a direction opposite to that of the member end to which they are adjacent, a pair of wheels, means supported by at least the first of said supports rotatably mounting each of said wheels between the first and second supports of each of said supporting means, a grass cutting unit supported by each of said second supports and the opposite end of said member, a gear connection between each of said wheels and the adjacent unit, a pair of arms, each of which is supported at one end by the wheel mounting means, and a handle connected to the other ends of said arms.

6. The lawn mower of claim 5 in which the handle is interconnected to the arms to pivot to a limited extent relative thereto.

MARY NORTON.

REFERENCES CITED

The following references are of record in the file of this patent:

UNITED STATES PATENTS

| Number | Name | Date |
| --- | --- | --- |
| 1,261,020 | Gilbertie | Apr. 2, 1918 |
| 1,394,351 | Pribnow | Oct. 18, 1921 |
| 1,607,382 | Zakrzewsky | Nov. 16, 1926 |